(12) United States Patent
Ewles

(10) Patent No.: US 8,747,037 B2
(45) Date of Patent: Jun. 10, 2014

(54) TIE DOWN DEVICES FOR SECURING A VEHICLE

(75) Inventor: Adam Ewles, Yorba Linda, CA (US)

(73) Assignee: Bar Cuffs, Inc., Yorba Linda, CA (US)

(*) Notice: Subject to any disclaimer, the term of this patent is extended or adjusted under 35 U.S.C. 154(b) by 0 days.

(21) Appl. No.: 13/568,980

(22) Filed: Aug. 7, 2012

(65) Prior Publication Data

US 2012/0321408 A1  Dec. 20, 2012

Related U.S. Application Data

(63) Continuation of application No. 10/722,550, filed on Nov. 28, 2003, now Pat. No. 8,235,633.

(51) Int. Cl.
*B60P 7/08* (2006.01)

(52) U.S. Cl.
USPC .............................. 410/120; 410/3

(58) Field of Classification Search
USPC ......... 410/2, 3, 4, 7, 9, 10, 11, 19, 20, 21, 22, 410/23, 77, 81, 97, 99, 100, 106, 120; 224/402–404, 536, 558, 420, 424, 425, 224/924, 570; 24/265 CD, 339, 483, 24, 24/484, 489, 517; 248/231.51, 230.4, 248/228.4, 214, 313, 229.13, 316.5, 229.23, 248/689, 62, 63, 74.1, 74.2, 74.3
See application file for complete search history.

(56) References Cited

U.S. PATENT DOCUMENTS

| | | | |
|---|---|---|---|
| 1,497,564 A | 6/1924 | Howells | |
| 5,020,676 A | 6/1991 | McFarland | |
| 5,746,074 A * | 5/1998 | Collins | |
| 6,171,034 B1 | 1/2001 | Burgoon et al. | |
| 8,235,633 B2 * | 8/2012 | Ewles | 410/120 |
| 2005/0117989 A1 | 6/2005 | Ewles | |

FOREIGN PATENT DOCUMENTS

| | | |
|---|---|---|
| EP | 1623915 | 2/2006 |
| JP | 11-094133 | 4/1999 |
| JP | 2003-284229 | 10/2003 |

* cited by examiner

*Primary Examiner* — Stephen Gordon
(74) *Attorney, Agent, or Firm* — Fish & Tsang LLP

(57) ABSTRACT

The inventive subject matter relates to novel tie down devices for securing a vehicle to a surface. In one preferred aspect of the inventive subject matter, the vehicle is secured during transport. The inventive apparatus may be used to secure a variety of vehicles having at least one generally rigid, elongated member, such as handlebars or a tubular frame member, to which the device is attached.

5 Claims, 2 Drawing Sheets

TIE DOWN DEVICES FOR SECURING A VEHICLE

This application is a continuation of U.S. patent application Ser. No. 10/722,550, filed on Nov. 28, 2003, now issued U.S. Pat. No. 8,235,633. These and all other extrinsic materials discussed herein are incorporated by reference in their entirety.

BACKGROUND OF THE INVENTIVE SUBJECT MATTER

1. Field of Inventive Subject Matter

The present inventive subject matter relates to novel tie down devices for securing a vehicle to a surface. In one preferred aspect of the inventive subject matter, the vehicle is secured during transport. The inventive apparatus may be used to secure a variety of vehicles having at least one generally rigid, elongated member, such as handlebars or a tubular frame member, to which the device is attached. For example, such vehicles include, but are not limited to, motorcycles, bicycles, snowmobiles, all-terrain vehicles, jet-skis, power boats, sailboats, ultralight aircraft, and the like.

2. Background

Cargo such as a wheeled vehicles is frequently difficult to adequately secure for transport, for example in or on a truck or trailer bed surface. Many devices are known for restraining a vehicle to a truck or trailer bed during transport. For example, U.S. Pat. Nos. 4,072,257, 4,078,821, 4,243,243, 4,441,736, 4,580,935, 4,611,961, 4,752,177, 4,842,458, 4,852,779, 5,230,449, 5,326,202, 5,529,448, 6,065,914, and 6,171,034 are representative of many patents which teach utility trailers, stabilizing hitches, racks, hand grip mounts, strapping systems, suspension wear reducers, and the like for securing a vehicle during towing or carrying.

In general, prior art restraint devices for such vehicles extend from a trailer or truck bed surface to one more handlebar attachment points. For example, these include an adjustable rod or strap, for example made of nylon, for each side of a handlebar. Each strap connects at one end to the trailer or truck bed surface and at the other end to a respective handlebar. Adjustment mechanisms permit the strap to be shortened or lengthened to accommodate vehicles of different sizes. Exemplary devices of this type are found in the following U.S. Patents:

U.S. Pat. No. 4,078,821, issued on Mar. 14, 1978 to Kitterman, discloses a utility trailer having a tie-down mounting system for securing vehicles having a pair of telescoping rods that are threaded together so that their combined length may be varied, with self-aligning bearings for insertion over pins that are connected to the vehicle to be restrained and to the frame, and which includes hose clamps for securing the pin to a frame member of the vehicle.

U.S. Pat. No. 4,580,935, issued on Apr. 8, 1986 to Treihaft, discloses a tie down system for a three wheeled motorcycle, which uses a pair of securing plates in conjunction with tie down straps to be located about the axle which supports the rear wheels of the motorcycle, and a spaced apart locking plate which utilizes a movable clamping bar to be tightly connected over a bracing bar mounted on the frame of the motorcycle.

U.S. Pat. No. 5,326,202, issued on Jul. 5, 1994 to Stubbs, discloses a strapping system having two interconnected straps with cuffs engaging the grips of the handle bars, for maintaining a motorcycle in an upright position during transport.

U.S. Pat. No. 6,065,914, issued on May 23, 2000 to Fotou, discloses a tie-down apparatus for securing a vehicle includes an elongated body, at least two attachment devices in communication with the body at opposite ends thereof, a tensioning device in communication with the body and configured to constantly apply a tightening force between at least two attachment devices, and an adjustment device in communication with the body for selectively applying a tightening force between two attachment devices.

U.S. Pat. No. 6,171,034, issued on Jan. 9, 2001 to Burgoon, et al., discloses a combination tie-down and locking device for a motorcycle having a plurality of forks, and a method of tying down and locking a motorcycle to a trailer, the device having a cut-resistant shackle for clamping around the fork of the motorcycle, a flexible, cut-resistant tie-down strap having one end securely fixed to the shackle, a quick-connect chain link for tensioning the strap and releasably connecting the free end of the strap to a trailer, and a lock for releasably locking the free end of the strap to a trailer.

Thus, present tie-down systems leave much to be desired. A common method uses one or more rope(s) or strap(s) to tie the vehicle down by attaching to a handlebar or other a frame member. This often leads to damage to the handlebar or frame member from chaffing, scratching, or bending. Additionally, other prior art restraint devices, such as tie-down rod(s), can scratch or indent the vehicle when the restraint is fastened thereto, and are complicated to use because of the need to tighten the restraint device to attach it to the vehicle. Therefore, it is desirable to provide a restraint device which does not damage the vehicle in any way when attached to the vehicle, and can be quickly and easily placed on, and removed from, the vehicle.

Accordingly, the inventive subject matter addresses this need by providing an improved tie-down device, which is clamped to an elongated, substantially rigid member of the vehicle, and to which an existing tie down system may then be attached. The inventive apparatus provides a tie-down device for securing a vehicle to a truck or trailer bed, or other surface, without damaging the secured vehicle.

SUMMARY OF THE INVENTIVE SUBJECT MATTER

The present inventive subject matter relates to a tie-down apparatus which is releasably attachable to a vehicle having an elongated, substantially rigid member, wherein said apparatus is a hinged clamp comprising:

i) a first clamp half (10) having a first end (12) and a second end (14);

ii) a second clamp half (16) having a first end (18) and a second end (20);

iii) a hinge (22) pivotally connecting said first clamp half first end (12) and said second clamp half first end (18), said hinge (22) having an axis of rotation (24) about which said first and second clamp halves are pivotable, wherein in a closed position, said first clamp half second end (14) and said second clamp half second end (20) overlap, and in an open position said first clamp half second end (14) and said second clamp half second end (20) do not overlap;

iv) a first bore hole (26) traversing the second end (14) of said first clamp half (10); and v) a second bore hole (28) traversing the second end (20) of said second clamp half (16), wherein said first and second bore holes (26) and (28) are aligned substantially parallel to said axis of rotation (24), wherein in said closed position, said first and second bore holes (26) and (28) are substantially aligned to each other axially, and wherein in said closed position, a recessed interior surface (30) of said clamp generally corresponds in shape to an exterior cross-sectional shape of said elongated, rigid member.

DETAILED DESCRIPTION OF THE INVENTIVE SUBJECT MATTER

Definitions

Figure 1:
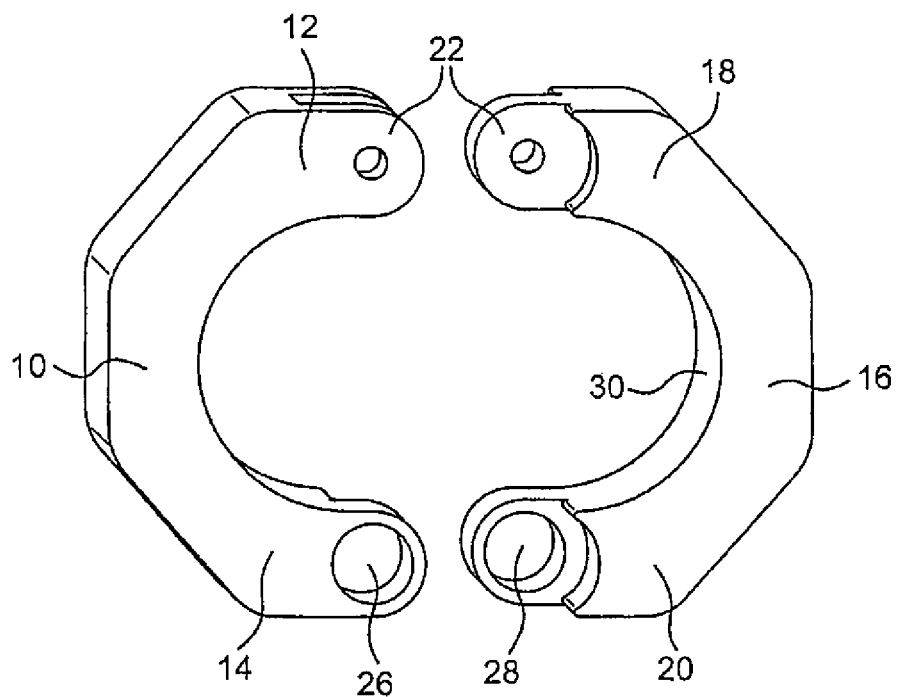
FIG. 1 is a drawing which depicts an exploded side perspective view of a tie down device in accordance with an aspect of the inventive subject matter.
Figure 2:
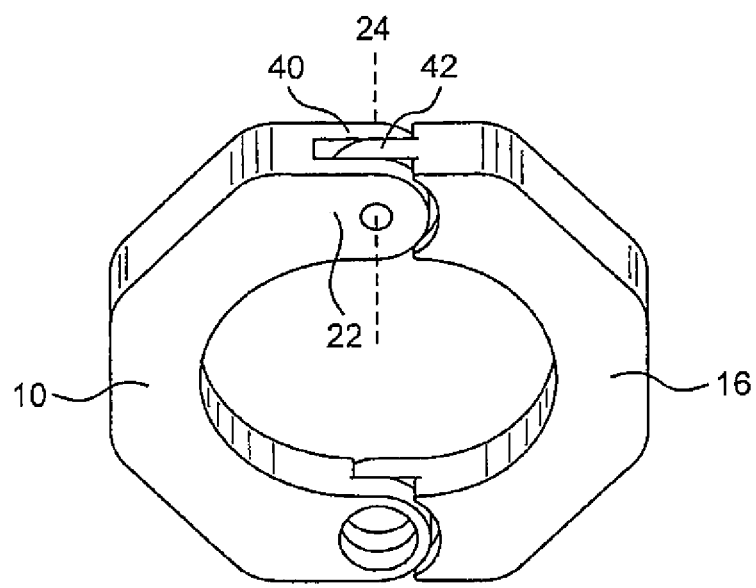
FIG. 2 is a drawing which depicts a back perspective view of a tie down device in the closed position, in accordance with an aspect of the inventive subject matter.
Figure 3:
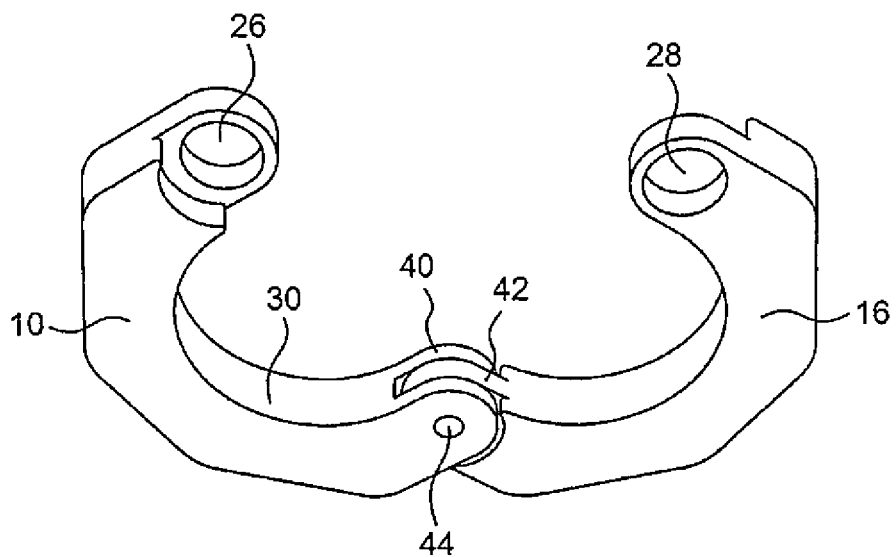
FIG. 3 is a drawing which depicts a front perspective view of a tie down device in the open position, in accordance with an aspect of the inventive subject matter.
Figure 4:
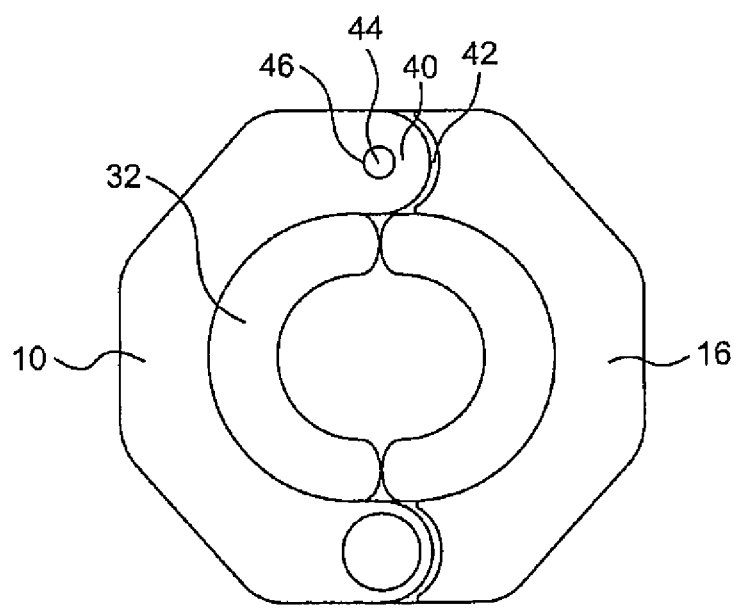
FIG. 4 is a drawing which depicts an orthogonal side view of a tie down device in the closed position, with an exemplary resilient, scratch-resistant material in place, in accordance with an aspect of the inventive subject matter.

The term "resilient" refers to the capacity of a material for returning to an original shape or position, as after having been compressed or deformed.

The term "hinge" refers to a device that holds two parts together so that one can swing relative to the other.

The term "substantially round" refers to the cross-sectional shape of the outer surface of an object which is either circular or elliptical.

The term "bushing" refers to a fixed or removable cylindrical lining used to constrain, guide, or reduce friction.

The Inventive Apparatus

The present inventive subject matter relates to a tie-down apparatus which is releasably attachable to a vehicle having an elongated, substantially rigid member. Exemplary elongated, rigid members found on vehicles which may require tie-down include, but are not limited to, the handlebars of bicycles, motorcycles, snowmobiles, all-terrain vehicles, and jet-skis; frame members of bicycles, snowmobiles, all-terrain vehicles, jet-skis, and ultralight aircraft; and railings found on snowmobiles, all-terrain vehicles, jet-skis, power boats, and sailboats. Such vehicles must be secured during transport, and often while in storage, and the owners of such vehicles are often quite proud of their vehicles, and thus sensitive to damage thereto. The inventive subject matter addresses the need for an improved device for securing a vehicle, such as to a truck or trailer bed surface, without damaging the vehicle to be secured.

Thus, the inventive tie-down apparatus is a hinged clamp comprising:

i) a first clamp half (10) having a first end (12) and a second end (14);

ii) a second clamp half (16) having a first end (18) and a second end (20);

iii) a hinge (22) pivotally connecting said first clamp half first end (12) and said second clamp half first end (18), said hinge (22) having an axis of rotation (24) about which said first and second clamp halves are pivotable, wherein in a closed position, said first clamp half second end (14) and said second clamp half second end (20) overlap, and in an open position said first clamp half second end (14) and said second clamp half second end (20) do not overlap;

iv) a first bore hole (26) traversing the second end (14) of said first clamp half (10); and v) a second bore hole (28) traversing the second end (20) of said second clamp half (16), wherein said first and second bore holes (26) and (28) are aligned substantially parallel to said axis of rotation (24), wherein in said closed position, said first and second bore holes (26) and (28) are substantially aligned to each other axially, and wherein in said closed position, a recessed interior surface (30) of said clamp generally corresponds in shape to an exterior cross-sectional shape of said elongated, rigid member.

In another aspect of the inventive subject matter, said apparatus further comprises a resilient, scratch-resistant lining (32) disposed on the recessed interior surface (30) of said clamp.

Methods and criteria for selecting suitable resilient, scratch-resistant lining materials are known to those of ordinary skill in the art, and depend on such factors as durability, flexibility, and tackiness of a material, and the strength and shape of the member which the material will contact. In a preferred embodiment, said lining (32) is selected from the group consisting of rubber, PVC tubing, polytetrafluoroethylene, and felt.

In another aspect of the inventive subject matter, said recessed interior surface (30) has a cross-sectional shape which is round, elliptical, regular polygonal, irregular polygonal, or polygonal with rounded corners.

It is expected that a majority of vehicles to be tied down using the inventive apparatus will have round or substantially round handlebars or frame members. Thus, in a preferred embodiment, said recessed interior surface (30) is substantially round.

In another aspect of the inventive subject matter, said hinge (22) comprises:

i) at least two interconnecting elements, wherein at least one interconnecting element (40) is projected from the first end (12) of said first clamp half (10) and at least one interconnecting element (42) is projected from the first end (18) of said second clamp half (16); and ii) a hinge pin (44).

The features, benefits, characteristics, and criteria for selection of hinges are well known to those of ordinary skill in the art. The drawings herein depict a hinge (22) having three interconnecting members, or "leaves," but one of ordinary skill will readily recognize that a hinge having two, four, five, or more leaves are equivalents and will serve the purposes of closing one side of the inventive apparatus and of providing a pivot point for easily opening and closing the inventive apparatus.

For additional durability and ease in opening and closing the inventive apparatus, said apparatus optionally comprises a hinge bushing (46) disposed between said interconnecting elements (40) and (42), and said hinge pin (44). Methods and criteria for selecting suitable bushings are known to those of ordinary skill in the art, and depend on such factors as durability and minimizing the coefficient of friction between moving parts. Thus, in one embodiment, said bushing (46) is selected from the group consisting of a polyurethane bushing, a polytetrafluoroethylene bushing, and a rubber bushing.

As was discussed above regarding hinges generally, the features, benefits, characteristics, and criteria for selection of hinge pins are well known to those of ordinary skill in the art, and depend on such factors as durability and ease of manufacture. In another aspect of the inventive subject matter, said hinge pin (44) is selected from the group consisting of a rivet, a screw, and a bolt and nut combination. In the case of a screw, it will be apparent to one of ordinary skill in the art that an inner surface of at least one interconnecting element (40) and/or (42) will be threaded, to correspond to the threading on said screw. The threading of screws and their corresponding interconnecting elements in hinges is well known.

In another aspect of the inventive subject matter, said apparatus additionally comprises a tie-down tensioning apparatus having (a) a first end (50) having an attachment device (52) for disposition through said first second bore holes (26) and (28), when said first and second bore holes are axially aligned in said closed position, (b) a second end (54) having an attachment device (56) for attachment to a transport or storage apparatus, and (c) a tensioning device (58) for applying a tightening force between said first end attachment device (52) and said second end attachment device (56). In a preferred embodiment, said tie-down apparatus is a strap, such as a nylon strap, cable, chain, or rod. Exemplary prior art tie-down devices are discussed in greater detail in the Background section above. Such devices are well known and readily available commercially.

The inventive device is preferably used during towing of a vehicle on the bed of a trailer or pick-up truck. However, due to the device's light weight and compact design, the device can be maintained in a portable carry bag and used as a primary or secondary vehicle restraint at any location.

The inventive device is designed, in a particular aspect, to be used to hold a vehicle within the bed of a pickup truck or trailer, although it is considered to be within the scope of the inventive subject matter that the inventive device can also used in other environments and applications.

The inventive subject matter being thus described, it will be obvious that the same may be modified or varied in many ways. Such modifications and variations are not to be regarded as a departure from the spirit and scope of the inventive subject matter and all such modifications and variations are intended to be included within the scope of the following claims.

The invention claimed is:

1. A tie-down apparatus comprising:
a first clamp half having a first end and a second end;
a second clamp half having a first end and a second end;
wherein the first end of the first clamp half has a first through hole and a second through hole, and the first and second through holes are axially aligned;
wherein the first end of the second clamp half has a third through hole, wherein the third through hole is disposed between, and axially aligned with, the first and second through holes;
a pin disposed in the first, second, and third through holes and defining an axis of rotation about which said first and second clamp halves are pivotable between a first position and a second position;
wherein in the first position, the second end of the first clamp half and the second end of the second clamp half overlap, and in the second position the second end of the first clamp half and the second end of the second clamp half do not overlap;
wherein the second end of the first clamp half and the second end of the second clamp half each have a curvature;
a first concave shoulder disposed on the second end of the first clamp half and having a curvature that mates with the curvature of the second end of the second clamp half; and
a second concave shoulder disposed on the second end of the second clamp half and having a curvature that mates with the curvature of the second end of the first clamp half.

2. The tie-down apparatus of claim 1, wherein the second end of the first clamp half has a fourth through hole and the second end of the second clamp half has a fifth through hole.

3. The tie-down apparatus of claim 2, wherein the fourth and fifth through holes have a center axis that is substantially parallel to the axis of rotation defined by the pin.

4. The tie-down apparatus of claim 3, wherein the fourth and fifth through holes overlap to form a tie-down attachment point when the first and second clamp halves are in the first position.

5. The tie-down apparatus of claim 4, wherein the fourth and fifth through holes are substantially aligned to each other axially in the first position.

* * * * *